US011799603B2

(12) United States Patent
Takeda et al.

(10) Patent No.: US 11,799,603 B2
(45) Date of Patent: *Oct. 24, 2023

(54) BASE STATION APPARATUS

(71) Applicant: NTT DOCOMO, INC., Tokyo (JP)

(72) Inventors: Daiki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/609,157

(22) PCT Filed: May 2, 2017

(86) PCT No.: PCT/JP2017/017317
§ 371 (c)(1),
(2) Date: Oct. 28, 2019

(87) PCT Pub. No.: WO2018/203418
PCT Pub. Date: Nov. 8, 2018

(65) Prior Publication Data
US 2020/0099567 A1 Mar. 26, 2020

(51) Int. Cl.
*H04L 5/00* (2006.01)
*H04L 27/00* (2006.01)
(Continued)

(52) U.S. Cl.
CPC ........ *H04L 5/0048* (2013.01); *H04L 27/0008* (2013.01); *H04L 27/2613* (2013.01);
(Continued)

(58) Field of Classification Search
None
See application file for complete search history.

(56) References Cited

U.S. PATENT DOCUMENTS 8,553,604 B2 * 10/2013 Kazmi ................. H04L 12/189
370/312
10,193,656 B2 * 1/2019 Rong .................... H04L 1/0046
(Continued)

FOREIGN PATENT DOCUMENTS

CA 3056908 A1 * 9/2018 ........... H04L 5/0048
CN 103428143 A * 12/2013
(Continued)

OTHER PUBLICATIONS

LG, "Discussion on SS blocks, SS burst set composition and time index indication," 3GPP TSG RAN WG1 Meeting #88bis; R1-1704862, Spokane, USA, Apr. 3-7, 2017.*
(Continued)

*Primary Examiner* — Andrew C Oh
(74) *Attorney, Agent, or Firm* — Osha Bergman Watanabe & Burton LLP

(57) ABSTRACT

A user apparatus that uses a plurality of subcarrier spacings is disclosed. The user apparatus includes a receiver that receives a synchronization signal and system information. The user apparatus further includes a processor that determines, on a basis of the subcarrier spacings, positions of symbols to which periodic blocks including the synchronization signal and the system information are mapped. In other aspects, a base station apparatus and a communication method are also disclosed.

7 Claims, 12 Drawing Sheets

(51) Int. Cl.
  *H04L 27/26* (2006.01)
  *H04W 56/00* (2009.01)
(52) U.S. Cl.
  CPC .... *H04L 27/26025* (2021.01); *H04L 27/2666* (2013.01); *H04W 56/001* (2013.01)

(56) References Cited

U.S. PATENT DOCUMENTS

| | | | | |
|---|---|---|---|---|
| 10,701,659 | B2* | 6/2020 | Frenger | H04W 60/04 |
| 10,742,465 | B2* | 8/2020 | Yamada | H04L 27/2607 |
| 2008/0205351 | A1* | 8/2008 | Lindoff | H04L 27/26025 |
| | | | | 370/336 |
| 2009/0129457 | A1* | 5/2009 | Akahori | H04L 25/0212 |
| | | | | 375/232 |
| 2009/0220027 | A1* | 9/2009 | Halfmann | H04L 1/0643 |
| | | | | 375/295 |
| 2009/0257517 | A1* | 10/2009 | Nordstrom | H04L 5/0007 |
| | | | | 375/260 |
| 2011/0038430 | A1* | 2/2011 | Yoshimoto | H04L 5/0055 |
| | | | | 375/259 |
| 2011/0164709 | A1* | 7/2011 | Park | H04L 25/0202 |
| | | | | 375/346 |
| 2012/0207254 | A1* | 8/2012 | Park | H04L 25/0256 |
| | | | | 375/343 |
| 2014/0205035 | A1 | 7/2014 | Ko et al. | |
| 2014/0206341 | A1 | 7/2014 | Siomina et al. | |
| 2014/0294124 | A1* | 10/2014 | Atungsiri | H04L 27/2607 |
| | | | | 375/295 |
| 2015/0055616 | A1* | 2/2015 | Kim | H04L 27/2605 |
| | | | | 370/330 |
| 2016/0050097 | A1* | 2/2016 | Atungsiri | H04L 27/2634 |
| | | | | 375/295 |
| 2016/0050635 | A1 | 2/2016 | Choi et al. | |
| 2016/0249355 | A1* | 8/2016 | Chae | H04L 5/0091 |
| 2016/0352551 | A1* | 12/2016 | Zhang | H04L 27/26025 |
| 2016/0360529 | A1* | 12/2016 | Lee | H04L 5/0085 |
| 2016/0373231 | A1* | 12/2016 | Yoon | H04B 7/0817 |
| 2017/0093540 | A1* | 3/2017 | Lei | H04J 11/0069 |
| 2017/0094547 | A1 | 3/2017 | Yum et al. | |
| 2017/0164350 | A1* | 6/2017 | Sun | H04L 5/0007 |
| 2017/0187499 | A1* | 6/2017 | Hwang | H04L 5/0051 |
| 2017/0257238 | A1* | 9/2017 | Qian | H04L 25/03834 |
| 2017/0294994 | A1 | 10/2017 | Shor et al. | |
| 2017/0318559 | A1* | 11/2017 | Islam | H04W 72/0453 |
| 2017/0325256 | A1* | 11/2017 | Islam | H04L 1/08 |
| 2018/0184439 | A1* | 6/2018 | Lee | H04W 72/21 |
| 2018/0198594 | A1* | 7/2018 | Tiirola | H04L 5/005 |
| 2018/0248735 | A1* | 8/2018 | Zhang | H04L 5/005 |
| 2018/0309533 | A1* | 10/2018 | Yoshimoto | H04L 27/26025 |
| 2019/0036746 | A1* | 1/2019 | Hwang | H04L 27/2607 |
| 2019/0044782 | A1* | 2/2019 | Zeng | H04L 27/26025 |
| 2019/0052503 | A1* | 2/2019 | Hayashi | H04L 5/0046 |
| 2019/0052504 | A1* | 2/2019 | Hayashi | H04W 72/0453 |
| 2019/0059075 | A1* | 2/2019 | Hayashi | H04L 27/26025 |
| 2019/0090284 | A1* | 3/2019 | Kang | H04L 5/0044 |
| 2019/0098626 | A1* | 3/2019 | Yi | H04W 72/0446 |
| 2019/0116007 | A1* | 4/2019 | Yi | H04W 72/0453 |
| 2019/0141659 | A1* | 5/2019 | Frenger | H04W 76/10 |
| 2019/0141737 | A1* | 5/2019 | Kim | H04W 72/23 |
| 2019/0149257 | A1* | 5/2019 | Jiang | H04L 27/26025 |
| | | | | 370/342 |
| 2019/0190687 | A1 | 6/2019 | Yi et al. | |
| 2019/0229880 | A1* | 7/2019 | Lin | H04L 27/26025 |
| 2019/0288899 | A1* | 9/2019 | Wang | H04L 27/2666 |
| 2019/0349167 | A1* | 11/2019 | Gao | H04W 72/1268 |
| 2019/0357123 | A1* | 11/2019 | Jha | H04L 1/00 |
| 2019/0380067 | A1* | 12/2019 | Rosa | H04W 36/0061 |
| 2020/0028726 | A1* | 1/2020 | Karlsson | H04L 27/2646 |
| 2020/0067669 | A1* | 2/2020 | Tang | H04B 7/0456 |
| 2020/0100241 | A1* | 3/2020 | Takeda | H04L 5/0007 |
| 2020/0119966 | A1* | 4/2020 | Takeda | H04W 56/001 |
| 2020/0120714 | A1* | 4/2020 | Wang | H04B 7/088 |
| 2020/0145939 | A1* | 5/2020 | Harada | H04W 56/001 |
| 2020/0296765 | A1* | 9/2020 | Kim | H04W 74/0833 |
| 2021/0307047 | A1* | 9/2021 | Lin | H04W 72/0446 |

FOREIGN PATENT DOCUMENTS

| | | | | | |
|---|---|---|---|---|---|
| CN | 108631982 | A | * | 10/2018 | ........... H04L 1/0006 |
| CN | 108282859 | B | * | 10/2020 | ........... H04J 11/0069 |
| CN | 108809551 | B | * | 9/2021 | ........... H04L 5/0048 |
| KR | 2018-0091320 | A | | 8/2018 | |
| WO | WO-2016000258 | A1 | * | 1/2016 | ............ H04W 56/00 |
| WO | WO-2018128218 | A1 | * | 7/2018 | ............ H04W 52/36 |
| WO | WO-2018165927 | A1 | * | 9/2018 | ........... H04J 11/0073 |
| WO | WO-2018173162 | A1 | * | 9/2018 | ........... H04L 5/0048 |

OTHER PUBLICATIONS

ETRI, "NR SS block and burst set composition," 3GPP TSG RNA WG1 Meeting #88bis, Spokane, USA, Apr. 3-7, 2017.*
Partial Supplementary European Search Report issued in counterpart European Patent Application No. 17908552.7, dated Oct. 26, 2020 (18 pages).
Samsung; "NR-PBCH designs"; 3GPP TSG RAN WG1 #88, R1-1702905; Athens, Greece; Feb. 13-17, 2017 (13 pages).
Nokia et al.; "SS Bandwidth, Numerology and Multiplexing"; 3GPP TSG RAN WG1 Meeting #88, R1-1703090; Athens, Greece; Feb. 13-17, 2017 (6 pages).
Convida Wireless et al.; "Discussion of PBCH Transmission in NR"; 3GPP TSG RAN WG1 Meeting #87, R1-1613008; Reno, USA; Nov. 14-18, 2016 (4 pages).
Huawei, HiSilicon; "Discussion on SS burst set composition and SS block time index indication"; 3GPP TSG RAN WG1 Meeting #88bis, R1-1705052; Spokane, USA; Apr. 3-7, 2017 (9 pages).
Extended European Search Report issued in counterpart European Patent Application No. 17913628.8, dated Nov. 30, 2020 (12 pages).
NTT Docomo, Inc.; "Discussion on SS block composition and SS burst set composition"; 3GPP TSG RAN WG1 Meeting #89, R1-1708437; Hanzhou, P.R. China; May 15-19, 2017 (5 pages).
LG Electronics; "Discussion on SS block, SS burst set composition and time index indication"; 3GPP TSG RAN WG1 Meeting #88bis, R1-1704862; Spokane, USA; Apr. 3-7, 2017 (8 pages).
ETRI; "NR SS block and burst set composition"; 3GPP TSG RAN WG1 Meeting #88bis, R1-1704944; Spokane, USA; Apr. 3-7, 2017 (5 pages).
Qualcomm Incorporated; "SS block and SS burst set composition consideration"; 3GPP TSG-RAN WG1 NR #89, R1-1708569; Hangzhou, P.R. China; May 15-19, 2017 (5 pages).
Office Action issued in the counterpart Japanese Patent Application No. 2019-516354, dated Jun. 23, 2020 (7 pages).
Sony; "On NR synchronization signal design"; 3GPP TSG RAN WG1 AH_NR Meeting, R1-1700665; Spokane, USA; Jan. 16-20, 2017 (4 pages).
International Search Report issued in PCT/JP2017/017317 dated Jul. 25, 2017 (5 pages).
Written Opinion of the International Searching Authority issued in PCT/JP2017/017317 dated Jul. 25, 2017 (5 pages).
Intel Corporation; "NR Synchronization Signal Time Indexing"; 3GPP TSG RAN WG1 Meeting RAN1 #88, R1-1702177; Athens, Greece; Feb. 13-17, 2017 (3 pages).
3GPP TS 36.213 V14.2.0; "3rd Generation Partnership Project; Technical Specification Group Radio Access Network; Evolved Universal Terrestrial Radio Access (E-UTRA); Physical layer procedures (Release 14)"; Mar. 2017 (454 pages).
3GPP TS 36.211 V14.2.0; "3rd Generation Partnership Project; Technical Specification Group Radio Access Network; Evolved Universal Terrestrial Radio Access (E-UTRA); Physical channesl and modulation (Release 14)"; Mar. 2017 (194 pages).
Ericsson; "SS Burst Set Composition"; 3GPP TSG-RAN WG1 Meeting #88bis, R1-1706008; Spokane, U.S.; Apr. 3-7, 2017 (6 pages).
ZTE, ZTE Microelectronics; "Composition of SS block, burst and burst set"; 3GPP TSG RAN WG1 Meeting #88bis, R1-1704358; Spokane, USA; Apr. 3-7, 2017 (10 pages).

(56) References Cited

OTHER PUBLICATIONS

Nokia, Alcatel-Lucent Shanghai Bell; "SS Block Composition, SS Burst Set Composition and SS Time Index Indication"; 3GPP TSG-RAN WG1 Meeting #88bis, R1-1705837; Spokane, WA, USA; Apr. 3-7, 2017 (13 pages).
Office Action in counterpart Korean Patent Application No. 10-2019-7032249 dated Jan. 20, 2021 (10 pages).
Extended European Search Report issued in counterpart European Patent Application No. 17908552.7, dated Jan. 20, 2021 (21 pages).
Nokia, Alcatel-Lucent Shanghai Bell; "On Requirements and Design of SS Burst Set and SS Block Index Indication"; 3GPP TSG-RAN WG1 Meeting #88, R1-1703092; Athens, Greece, Feb. 13-17, 2017 (15 pages).
Qualcomm Incorporated; "SS block, burst-set composition, and time index indication"; 3GPP TSG-RAN WG1 NR #88bis, R1-1705565; Spokane, USA, Apr. 3-7, 2017 (9 pages).
NTT Docomo, Inc.; "Discussion on SS block composition, SS burst set composition and SS block index indication for NR"; 3GPP TSG RAN WG1 Meeting #88bis, R1-1705705; Spokane, USA, Apr. 3-7, 2017 (8 pages).
Office Action issued in U.S. Appl. No. 16/621,589; dated May 12, 2021 (45 pages).
Office Action issued in U.S. Appl. No. 16/621,589; dated Nov. 29, 2021 (26 pages).
3GPP TSG RAN WG1 Meeting #89; R1-1707043 "The composition of SS blocks and SS burst sets" ZTE; Hangzhou, China; May 15-19, 2017 (9 pages).
Office Action issued in Chinese Application No. 201780091921.5; dated Aug. 8, 2022 (18 pages).
Office issued in the counterpart Colombian Patent Application No. NC2019/0013174, dated Jun. 13, 2022 (17 pages).
Office Action in counterpart ARIPO Patent Application No. AP/P/2019/011995 dated Aug. 24, 2022 (4 pages).
Office Action issued in African Application No. AP/P/2019/011995 dated Nov. 16, 2022 (5 pages).
Office issued in counterpart Colombian Patent Application No. NC2019/0013174 dated Oct. 16, 2022 (28 pages).
Office Action issued in counterpart Colombian Patent Application No. NC2019/0013174 dated Jan. 30, 2023 (25 pages).
Office Action issued in Chinese Application No. 201780090217.8, dated Dec. 28, 2022 (23 pages).
3GPP TR 38.802 V14.0.0; "3rd Generation Partnership Project; Technical Specification Group Radio Access Network; Study on New Radio Access Technology Physical Layer Aspects (Release 14)"; Mar. 2017 (9 pages).
Office Action in counterpart ARIPO Patent Application No. AP/P/2019/011995 dated May 16, 2023 (5 pages).
Office Action issued in Chinese Application No. 201780091921.5, dated May 26, 2023 (12 pages).

* cited by examiner

FIG.9

| SCS AT WHICH SS BLOCKS ARE TRANSMITTED | MAXIMUM NUMBER OF SS BLOCKS PER SS BURST SET PERIODICITY |
|---|---|
| 15 kHz | 4 |
| 30 kHz | 8 |
| 120 kHz | 64 |
| 240 kHz | 64 |

BASE STATION APPARATUS

TECHNICAL FIELD

The present invention relates to a base station apparatus in a radio communication system.

BACKGROUND ART

Concerning 3GPP (3rd Generation Partnership Project), a radio communication scheme called 5G or NR (New Radio) (hereinafter, such a radio communication scheme being referred to as "NR") has been discussing a further increase in the system capacity, a further increase in the data transmission rate, a further reduction in the delay in the radio section, and so forth. Concerning the NR, various radio technologies have been studied for a satisfaction of a requirement for the throughput greater than or equal to 10 Gbps and the delay in the radio section less than or equal to 1 ms.

According to the NR, in an initial access for establishing a connection between a user apparatus and a base station apparatus, the user apparatus performs cell detection and cell identification using a synchronization signal transmitted from the base station apparatus and obtains some of system information required for the initial access (for example, Non-patent Document No. 1).

In addition, concerning the NR, discussions have been made for applying different SCSs (Subcarrier-Spacings) as structures of radio frames. In this regard, for example, 15 kHz, 30 kHz, 60 kHz, 120 kHz, and 240 kHz are assumed as SCSs. Moreover, concerning the NR, it is assumed to use a wide range of frequencies from a low frequency band similar to LTE (Long Term Evolution) to a further higher frequency band. In particular, because there is a high propagation loss in a high-frequency band, discussions have been made for applying beam forming having a narrow beam width in order to compensate for the propagation loss (for example, Non-patent Document No. 2).

PRIOR ART DOCUMENTS

Non-Patent Document

Non-patent Document No. 1:
  3GPP TS 36.213 V14.2.0 (2017-03)
Non-patent Document No. 2:
  3GPP TS 36.211 V14.2.0 (2017-03)

SUMMARY OF THE INVENTION

Problem to be Solved by the Invention

According to the NR, a synchronization signal and some of system information required for an initial access are mapped in a radio frame on the basis of resource units called SS blocks (Synchronization Signal Blocks) including continuous (consecutive) OFDM (Orthogonal Frequency Division Multiplexing) symbols. Moreover, according to the NR, a case is assumed in which different SCSs are applied to radio frames in parallel.

In this regard, because SS blocks are transmitted from a base station apparatus repeatedly, there may be a case where, during a period during which SS blocks are mapped in a radio frame to which a different SCS is applied, an opportunity (occasion) to transmit a DL (Downlink) or UL (Uplink) control signal is prevented (inhibited).

The present invention has been made in view of the above and an object of the present invention is to provide a technology in a radio communication system including a base station apparatus and a user apparatus for the base station apparatus to appropriately arrange blocks including a synchronization signal and system information in a radio signal in order to implement an efficient resource arrangement.

Means to Solve the Problem

According to the disclosed technology, a base station apparatus that performs communication with a plurality of user apparatuses includes a transmission unit that transmits a plurality of radio signals to the plurality of user apparatuses; and a control unit that arranges periodic blocks including a synchronization signal and system information in one or a plurality of radio signals from among the plurality of radio signals on the basis of subcarrier spacings.

Advantageous Effects of the Invention

According to the disclosed technology, in a radio communication system including a base station apparatus and a user apparatus, a technology is provided for appropriately arranging blocks including a synchronization signal and system information in a radio signal in order to implement an efficient resource arrangement.

BRIEF DESCRIPTION OF THE DRAWINGS

FIG. 9 illustrates an example of the number of SS blocks that is set for each SCS according to an embodiment of the present invention.

MODE FOR CARRYING OUT THE INVENTION

Below, embodiment(s) of the present invention will be described with reference to the drawings. Note that the embodiments that will be described are merely examples and the embodiments to which the present invention is applied are not limited to the embodiments that will be described.

Existing technologies may be used for a radio communication system according to an embodiment of the present invention in order to operate appropriately. In this regard, the existing technologies include, for example, existing LTE. However, the existing technologies are not limited to the existing LTE. Further, unless otherwise noted, "LTE" used herein has a wide meaning covering LTE-Advanced and schemes developed after LTE-Advanced (for example, the NR).

Moreover, in the following description of an embodiment, terms such as a SS (Synchronization Signal), a PSS (Primary SS), a SSS (Secondary SS), a PBCH (Physical broadcast channel), and so forth included in the existing LTE are used. However, these terms are described for the sake of convenience of explanation, and, similar signals, functions, and so forth may be referred to by different names. Moreover, the above-described terms in the NR will be referred to as an NR-SS, an NR-PSS, an NR-SSS, an NR-PBCH, and so forth.

Below, an entire system configuration and an example of an initial access will be described as a basic example, and thereafter, first and second embodiments of the present invention will be described. The first and second embodiments are based on the basic example. However, the first and second embodiments may be based on a system or an initial access different from the system or the initial access of the basic example.

BASIC EXAMPLE

<Entire System Configuration>

Figure 1:
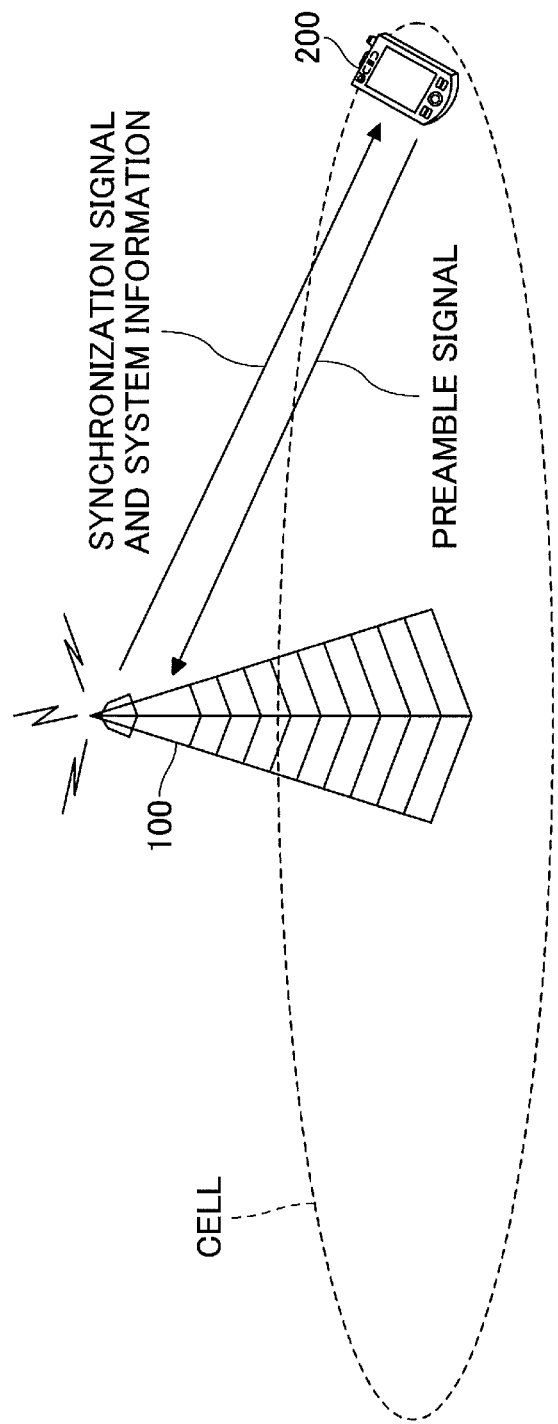
FIG. 1 illustrates a configuration of a radio communication system according to an embodiment of the present invention.

FIG. 1 illustrates a configuration of a radio communication system according to an embodiment of the present invention. The radio communication system according to an embodiment of the present invention includes, as illustrated in FIG. 1, a base station apparatus 100 and a user apparatus 200. Although a single base station apparatus 100 and a single user apparatus 200 are illustrated in FIG. 1, this is an example, and each of them may be a plurality of apparatuses.

The base station apparatus 100 provides one or more cells and is a communication apparatus that performs communication with the user apparatus 200. As illustrated in FIG. 1, the base station apparatus 100 transmits a synchronization signal and system information to the user apparatus 200. A synchronization signal is, for example, an NR-PSS or an NR-SSS. System information is transmitted, for example, through an NR-PBCH. Each of the base station apparatus 100 and the user apparatus 200 can perform signal transmission and reception using beam forming. The user apparatus 200 is a communication apparatus having a radio communication function such as a smartphone, a cellular phone, a tablet, a wearable terminal, or a communication module for M2M (Machine-to-Machine), wirelessly connects with the base station apparatus 100, and uses various communication services provided by the radio communication system. At a stage of an initial access, as illustrated in FIG. 1, the user apparatus 200 transmits a random access preamble signal to the base station apparatus 100. The random access procedure is performed on the basis of system information received through an NR-PDSCH (Physical downlink shared channel) in addition to system information received through an NR-PBCH from the base station apparatus 100. In the present embodiment, the duplex scheme may be a TDD (Time Division Duplex) scheme or a FDD (Frequency Division Duplex) scheme.

Hereinafter, transmission of a signal with the use of a transmission beam has the same meaning as transmission of a signal multiplied with a precoding vector (or precoded with a precoding vector). In the same way, reception with the use of a reception beam has the same meaning as multiplying a received signal with a predetermined weight vector. In addition, transmission of a signal with the use of a transmission beam may be expressed as transmission of a signal with the use of a specific antenna port. In the same way, reception of a signal with the use of a reception beam may be expressed as reception of a signal with the use of a specific antenna port. An antenna port means a logical antenna port defined in the 3GPP standard. Note that methods of forming a transmission beam and a reception beam are not limited to the above-mentioned methods. For example, also a method of changing respective angles of a plurality of antennas of the user apparatus 10 or the base station 20 may be used. Also a method of combining the method of using a precoding vector with the method of changing angles of antennas may be used. Also another method may be used. Moreover, for example, in a high-frequency band, a plurality of different transmission beams may be used. Using a plurality of transmission beams will be referred to as a multi-beam operation; using a single transmission beam will be referred to as a single-beam operation.

<Example of Initial Access>

Figure 2:
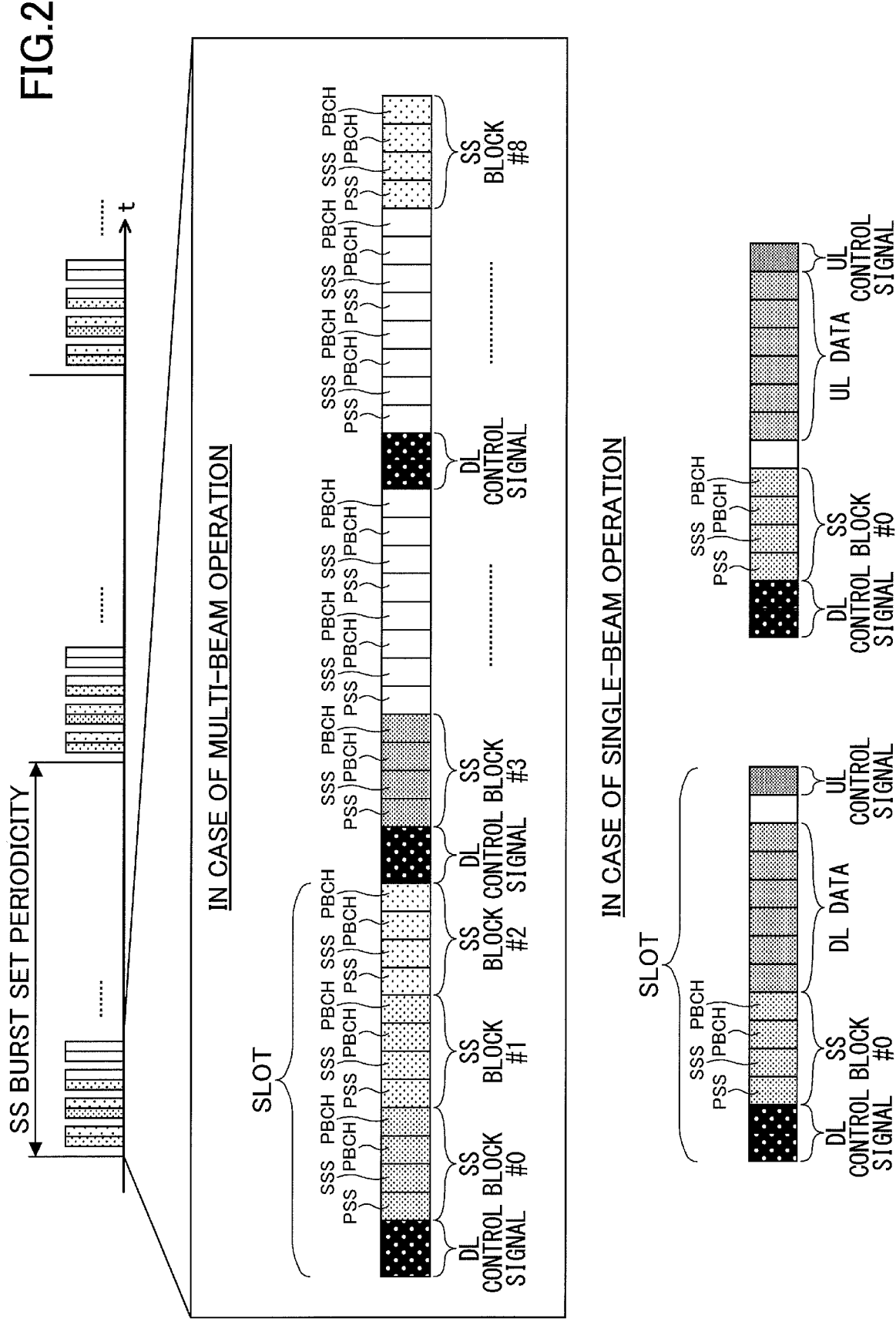
FIG. 2 illustrates an example of mapping of SS blocks related to an initial access.

FIG. 2 illustrates an example of mapping of SS blocks related to an initial access. "SS blocks" illustrated in FIG. 2 are resource units including a single NR-PSS, a single NR-SSS, and a single NR-PBCH associated with each other. An NR-PSS is a PSS in the NR transmitted from the base station apparatus 100 to the user apparatus 200 and is used at least at an initial time or for frequency synchronization. An NR-SSS is an SSS in the NR transmitted from the base station apparatus 100 to the user apparatus 200 and is used at least for identifying a cell ID (identity). An NR-PBCH is a PBCH in the NR transmitted from the base station apparatus 100 to the user apparatus 200 and is a channel for transmitting information for obtaining, after detecting an NR-PSS and an NR-SSS, some of system information, for example, an SFN (System Frame Number) and other system information, required for an initial access, and so forth. FIG. 2 illustrates an example where a single SS block includes a total of 4 symbols including an OFDM symbol (hereinafter, referred to as a "symbol") of an NR-PSS, a symbol of an NR-SSS, and two symbols of NR-PBCH. The number of symbols included in a SS block is not limited to 4, and may be 5, 6, etc.

An "SS burst set" illustrated in FIG. 2 is a periodic resource group including one or a plurality of SS blocks. An "SS burst set periodicity" is a period during which the SS burst sets are transmitted from the base station apparatus 100 to the user apparatus 200. The period may be, for example, 20 ms or 5 ms, and may be changed as necessary.

A "slot" illustrated in FIG. 2 is a unit defining a structure of a radio frame in the NR and includes, for example, 14 symbols. Alternatively, for example, one slot may include 7 symbols.

FIG. 2 illustrates an example where, in a case of multi-beam operation, a single SS burst set includes 9 SS blocks. In this case, SS blocks #0-#8 are SS blocks associated with different beams, respectively. FIG. 2 illustrates an example where, in a case of single-beam operation, a single SS burst set includes a single SS block. In this regard, the number of a plurality of SS blocks repeatedly transmitted may be 8, 64, etc. Moreover, at a first few symbols of each slot included in a radio frame, a DL control signal may be placed. At a last few symbols of each slot included in a radio frame, a UL control signal may be placed. Moreover, in a radio frame, DL data and UL data may be placed.

For example, in a case of multi-beam operation, the user apparatus 200 detects and obtains an SS block from among the SS blocks #0-#8 and uses a resource associated with the SS block to perform an initial access to the base station apparatus 100.

Figure 3:
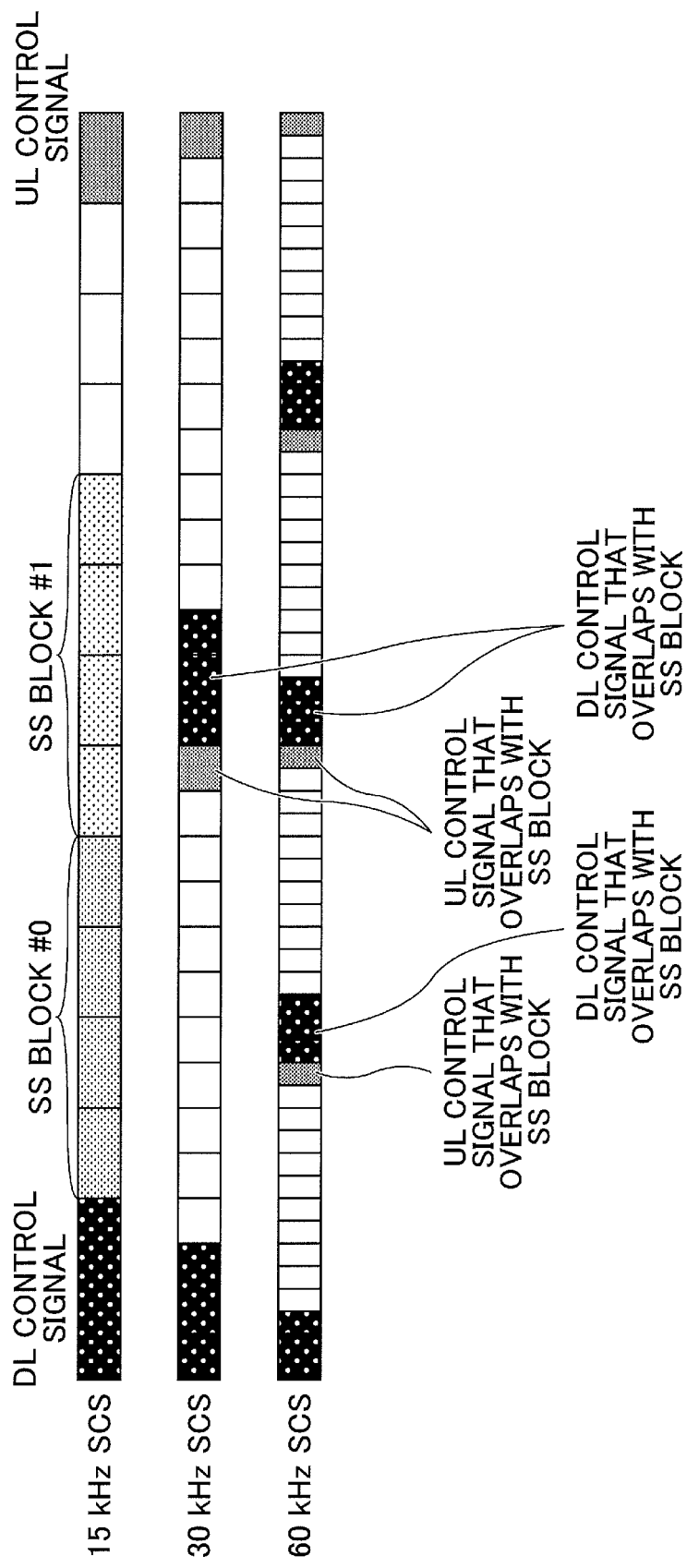
FIG. 3 illustrates a first example of mapping of SS blocks with respect to different SCSs.

FIG. 3 illustrates a first example of mapping of SS blocks with respect to different SCSs. FIG. 3 illustrates a case where SCSs are 15 kHz, 30 kHz, and 60 kHz. In a radio frame with 15 kHz SCS, SS blocks are mapped. Moreover, in the radio frame with 15 kHz SCS, a DL control signal is mapped to the first 2 symbols; a UL control signal is mapped to the last 2 symbols. As illustrated in FIG. 3, during the period where the SS block #0 is mapped, a UL control signal and a DL control signal are mapped in the radio frame with 60 kHz SCS. Moreover, during the period where the SS block #1 is mapped, a UL control signal and a DL control signal are mapped in the radio frame with 30 kHz SCS, and also, a UL control signal and a DL control signal are mapped in the radio frame with 60 kHz SCS. The opportunities (occasions) to transmit the UL control signals and the DL control signals, which are mapped during the periods where the SS blocks are transmitted, are prevented (inhibited). In the example illustrated in FIG. 4, four symbols of the control signals in the radio frame with 30 kHz SCS and eight symbols of the control signals in the radio frame with 60 kHz SCS overlap with the periods for transmitting the SS blocks.

Figure 4:
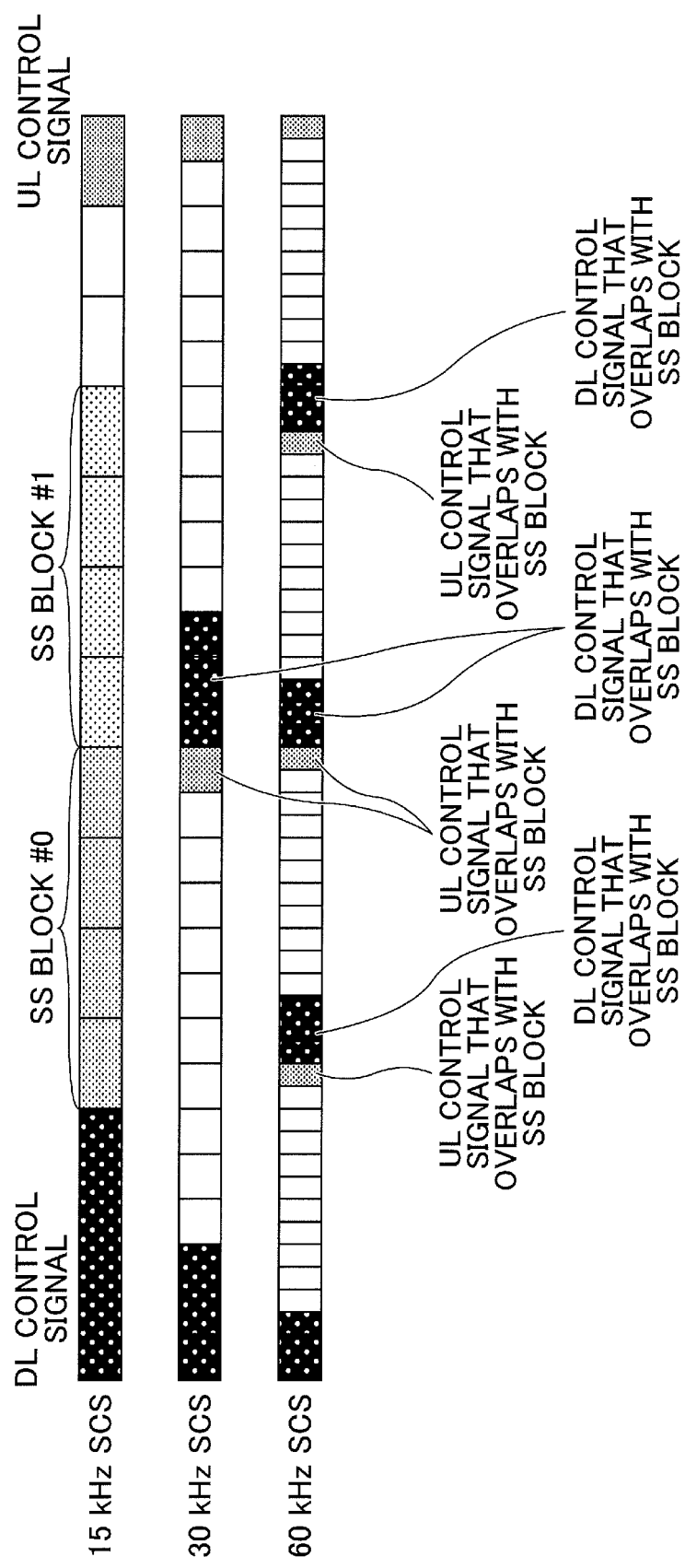
FIG. 4 illustrates a second example of mapping of SS blocks with respect to different SCSs.

FIG. 4 illustrates a second example of mapping of SS blocks with respect to different SCSs. In the same way as in FIG. 3, FIG. 4 illustrates a case where SCSs are 15 kHz, 30 kHz, and 60 kHz; SS blocks are mapped in the radio frame with 15 kHz SCS. Moreover, in the radio frame with 15 kHz SCS, a DL control signal is mapped to the first 3 symbols; a UL control signal is mapped to the last 1 symbol. As illustrated in FIG. 4, during the period where the SS block #0 is mapped, a UL control signal is mapped in the radio frame with 30 kHz SCS, and also, UL control signals and a DL control signal are mapped in the radio frame with 60 kHz SCS. Moreover, during the period where the SS block #1 is mapped, a DL control signal is mapped in the radio frame with 30 kHz SCS, and also, a UL control signal and DL control signals are mapped in the radio frame with 60 kHz SCS. The opportunities to transmit the UL control signals and DL control signals, which are mapped during the periods where the SS blocks are transmitted, are prevented (inhibited). In the example illustrated in FIG. 4, 4 symbols of the control signals in the radio frame with 30 kHz SCS and 11 symbols of the control signals in the radio frame with 60 kHz SCS overlap with the periods of transmitting the SS blocks.

First Embodiment

Below, a first embodiment will be described. Note that, in the description of the first and second embodiments, improvement points with respect to the above-described basic example will be described. Therefore, the basic example is applied unless otherwise described. Moreover, each of the first and second embodiments may be implemented alone. Also, a combination of the first and second embodiments may be implemented.

Figure 5:
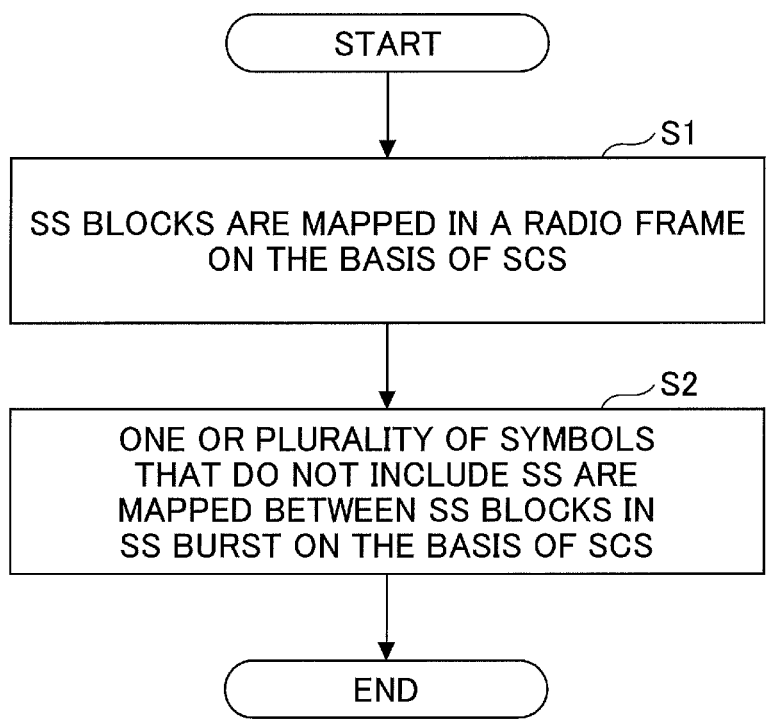
FIG. 5 is a flowchart illustrating a procedure where SS blocks are mapped in a radio frame according to an embodiment of the present invention.

FIG. 5 is a flowchart illustrating a procedure for mapping SS blocks in a radio frame according to an embodiment of the present invention.

In step S1, the base station apparatus 100 maps SS blocks in a radio frame on the basis of an SCS. That is, mapping of SS blocks with one SCS may be different from mapping of SS blocks with another SCS.

In step S2, the base station apparatus 100 arranges (places) one or a plurality of symbols between SS blocks within a SS burst set on the basis of the SCS. The number of the symbols may be zero (0). During the period during which the symbols are arranged (placed), opportunities to transmit control signals may be increased. Opportunities to transmit control signals mean opportunities to transmit control signals that are transmitted by the base station apparatus 100 or the user apparatus 200 in a radio frame configured with an SCS different from the SCS of the radio frame in which SS blocks are transmitted.

Note that step S2 illustrates an example of mapping. For example, the base station apparatus 100 may perform mapping also according to the second embodiment that will be described later, or may perform mapping on the basis of another SCS.

Note that, by receiving the SS blocks mapped in the radio frame in the above-described step, the user apparatus 200 performs synchronization and obtains information needed for a random access to implement an initial access.

Figure 6:
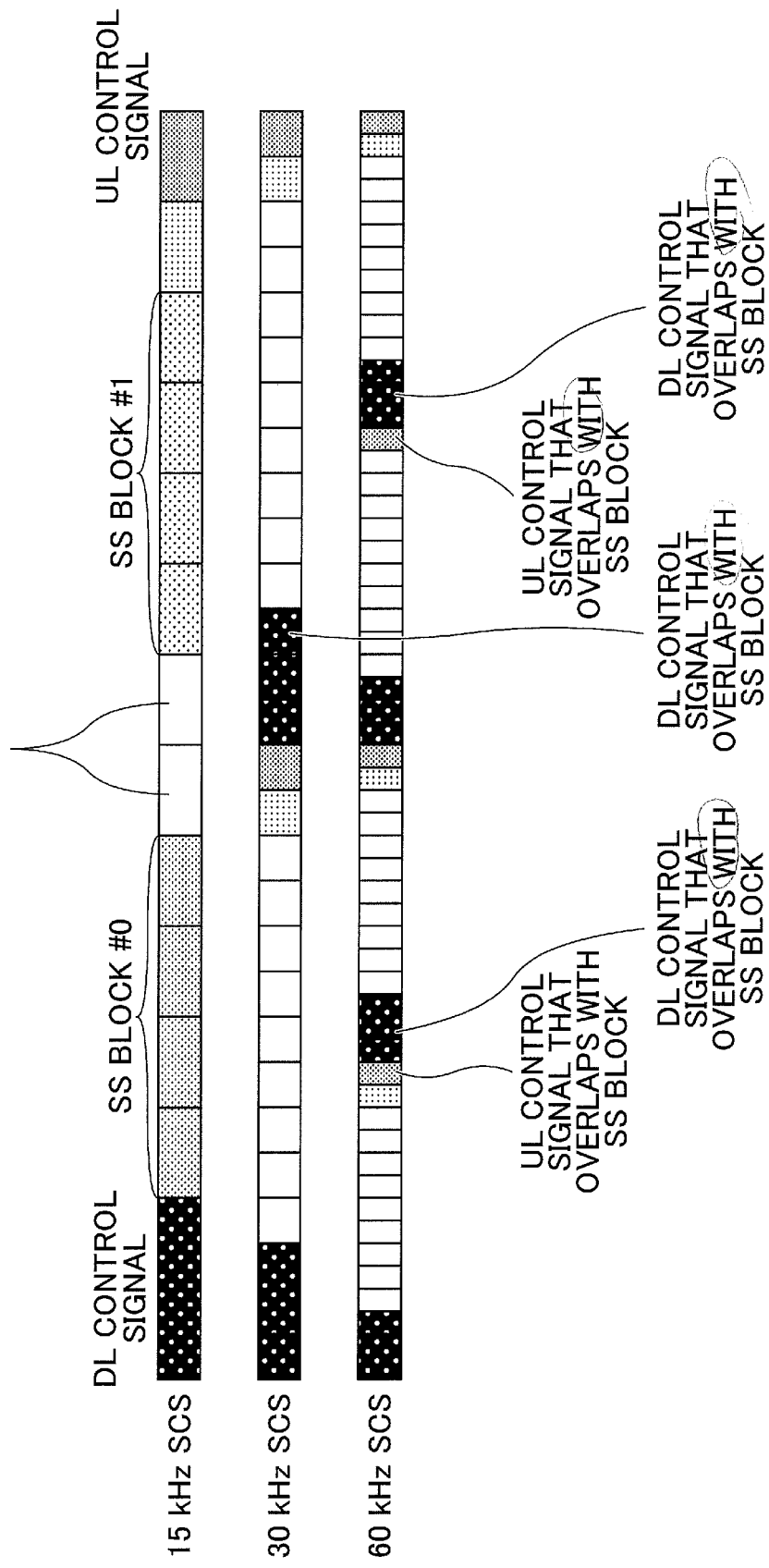
FIG. 6 illustrates an example of mapping for a case where SS blocks are transmitted with a 15 kHz SCS according to an embodiment of the present invention.

FIG. 6 illustrates an example of mapping for a case where SS blocks are transmitted with 15 kHz SCS according to an embodiment of the present invention. In the radio frames of FIG. 6, three SCSs, which are a 15 kHz SCS, a 30 kHz SCS, and a 60 kHz SCS, are used. As illustrated in FIG. 6, in a case where SS blocks are transmitted with 15 kHz SCS, the SS block #0 and the SS block #1 are not continuously (consecutively) mapped: the SS blocks #0 and #1 are mapped with a space of two symbols. Through the mapping, the opportunities to transmit the control signals mapped in the radio frames with 30 kHz SCS and 60 kHz SCS in the period of the two symbols are not prevented (inhibited). In the example illustrated in FIG. 6, a symbol of a control signal in the radio frame with 30 kHz SCS overlaps with an SS block; 8 symbols of control signals in the radio frame with 60 kHz SCS overlap with SS blocks. Thus, according to the mapping of SS blocks illustrated in FIG. 6, the number of symbols of the control signals overlapping with SS blocks is smaller than that of the mapping of SS blocks illustrated in FIG. 3 or 4. In other words, the opportunities to transmit the control signals increase.

Note that, in a case where SS blocks are mapped in a radio frame in the above-described manner, the user apparatus 200 can transmit and receive control signals during periods between SS blocks where an SS is not placed.

Figure 7:
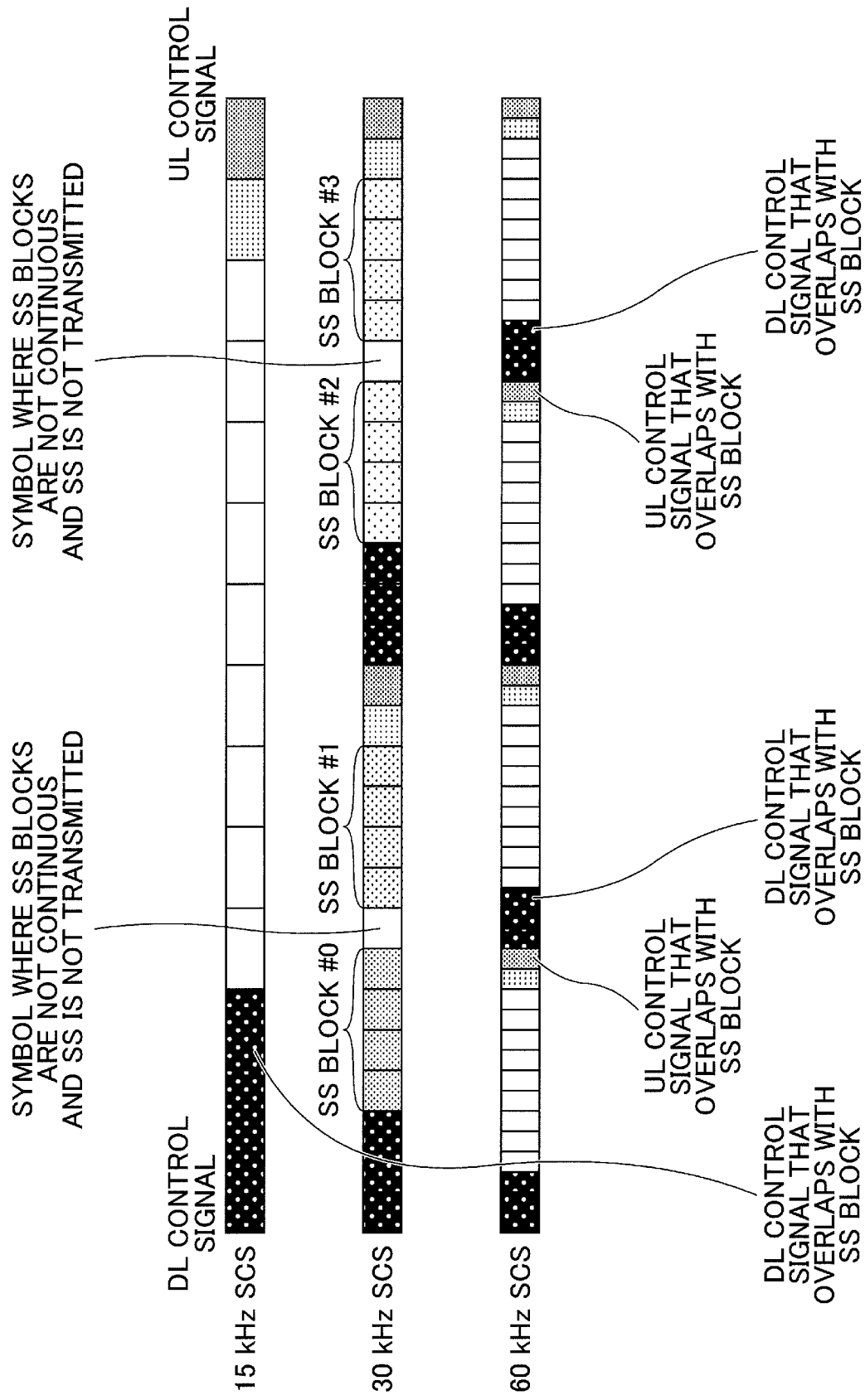
FIG. 7 illustrates an example of mapping for a case where SS blocks are transmitted with a 30 kHz SCS according to an embodiment of the present invention.

FIG. 7 illustrates an example of mapping for a case where SS blocks are transmitted with 30 kHz SCS according to an embodiment of the present invention. In the radio frames in FIG. 7, three SCSs, which are a 15 kHz SCS, a 30 kHz SCS, and a 60 kHz SCS, are used. As illustrated in FIG. 7, in a case where SS blocks are transmitted with 30 kHz SCS, the SS block #0 and the SS block #1 are not continuously mapped: the SS blocks #0 and #1 are mapped with a space of one symbol. Similarly, the SS block #2 and the SS block #3 are not continuously mapped: the SS blocks #2 and #3 are mapped with a space of one symbol. Through the mapping, opportunities to transmit the control signals mapped in the period of 1 symbol are not prevented (inhibited) in the radio frames with 15 kHz SCS and 60 kHz SCS. In the example illustrated in FIG. 7, two (2) symbols of a control signal in the radio frame with 15 kHz SCS overlap with SS blocks; four (4) symbols of control signals in the radio frame with 60 kHz SCS overlap with SS blocks. In this regard, if a case where the SS block #0 and the SS block #1 are continuously mapped is assumed, for example, it can be seen that the number of symbols overlapping with SS blocks further increases by 4 with respect to DL control signals in the radio frame with 60 kHz SCS.

Note that, in the same way as in FIG. 6, in a case where SS blocks are mapped in a radio frame in the above-described manner, the user apparatus 200 can transmit and receive control signals during periods between SS blocks where an SS is not placed.

Figure 8:
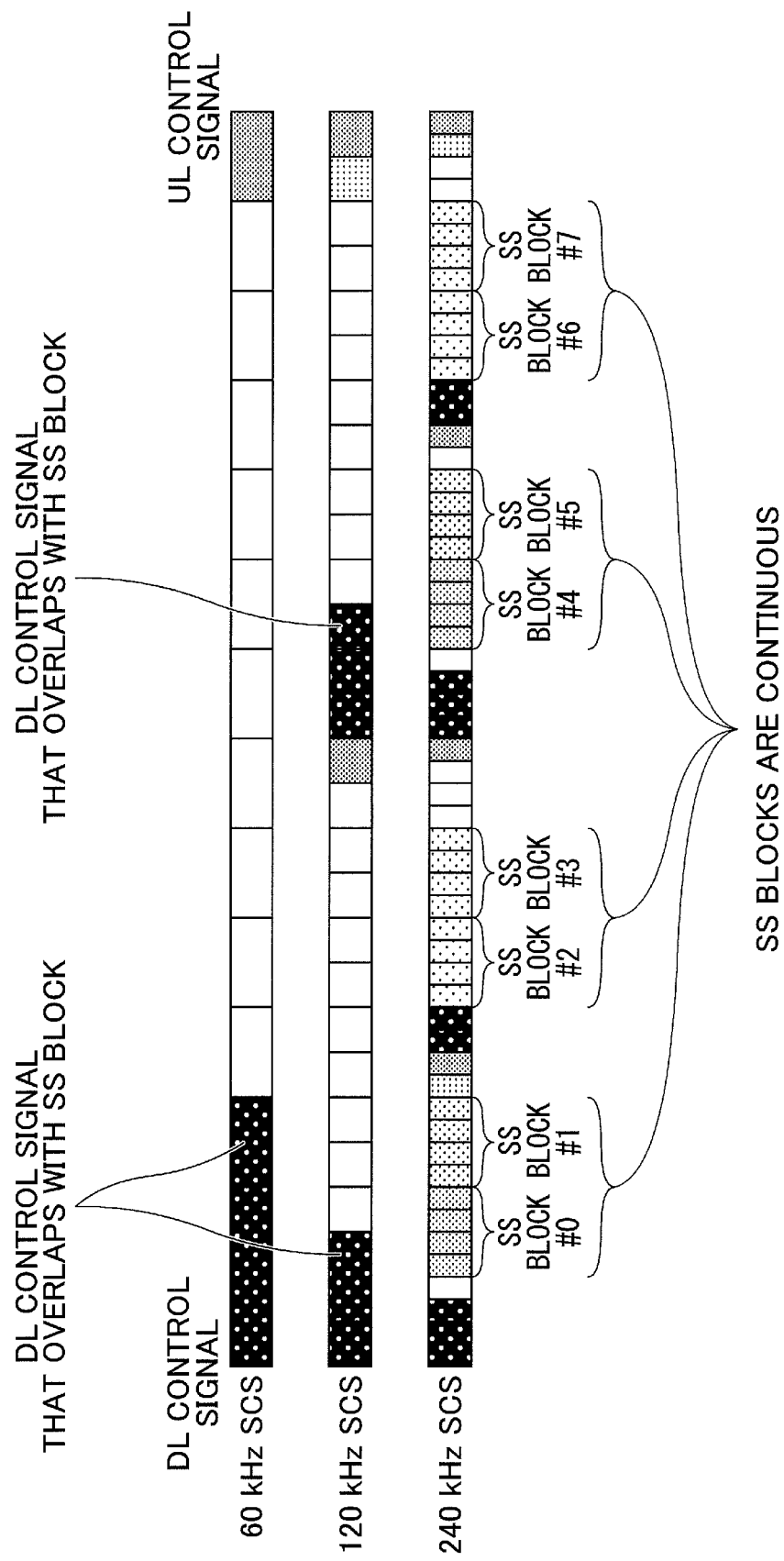
FIG. 8 illustrates an example of mapping for a case where SS blocks are transmitted with a 240 kHz SCS according to an embodiment of the present invention.

FIG. 8 illustrates an example of mapping for a case where SS blocks are transmitted with a 240 kHz SCS according to an embodiment of the present invention. In the radio frames in FIG. 8, three SCSs, which are a 60 kHz SCS, a 120 kHz SCS, and a 240 kHz SCS, are used. As illustrated in FIG. 8, in a case where SS blocks are transmitted with 240 kHz SCS, different from FIGS. 6 and 7, the SS block #0 and the SS block #1 are continuously mapped, and, in the same way, each two SS blocks from among the SS blocks #2-#7 are continuously mapped. At this time, 2 symbols of a DL control signal in the radio frame with 60 kHz SCS overlap with SS blocks; 2 symbols of a DL control signal in the radio frame with 120 kHz SCS overlap with SS blocks. However, the number of overlapping symbols of control signals is relatively small.

In a case of avoiding overlapping between SS blocks and control signals by non-continuously (non-consecutively) mapping SS blocks in consideration for opportunities to transmit control signals, the user apparatus 200 needs to have a longer search window to observe non-continuously mapped SS blocks, and power consumption accordingly becomes a concern. By mapping SS blocks according to SCSs as illustrated in FIG. 8, even when SS blocks are continuously mapped, overlapping with control signals may be small. As a result, the user apparatus 200 may not use a longer search window for SS, and thus, it is possible to reduce power consumption.

According to the above-described first embodiment, as a result of the base station apparatus 100 performing appropriate mapping of SS blocks in a radio frame on the basis of SCSs, it is possible to implement an efficient resource arrangement for transmitting control signals.

Second Embodiment

FIG. 9 illustrates an example of the number of SS blocks that is set for each SCS according to an embodiment of the present invention. As illustrated in FIG. 9, the base station apparatus 100 maps SS blocks while setting the maximum number of SS blocks existing in the period of SS burst set periodicity on the basis of the SCS with which the SS blocks are transmitted. In the example of FIG. 9, in a case of a 15 kHz SCS, the maximum number of SS blocks is four (4); in a case of a 30 kHz SCS, the maximum number of SS blocks is eight (8); in cases of a 120 kHz SCS and a 240 kHz SCS, the maximum number of SS blocks is 64.

In this regard, concerning obtaining specific SS blocks associated with a beam necessary for the user apparatus 200 to start communication, the number of SS blocks needed to be placed in each slot differs according to SCSs. By changing the number of SS blocks to be placed in each slot according to SCSs, the user apparatus 200 can receive, in the same period regardless of the SCS, SS blocks that are required to be received to complete a measurement. There-fore, the user apparatus 200 can have the same measurement period regardless of SCSs. Thus, the user apparatus 200 can implement an efficient measurement.

Figure 10:
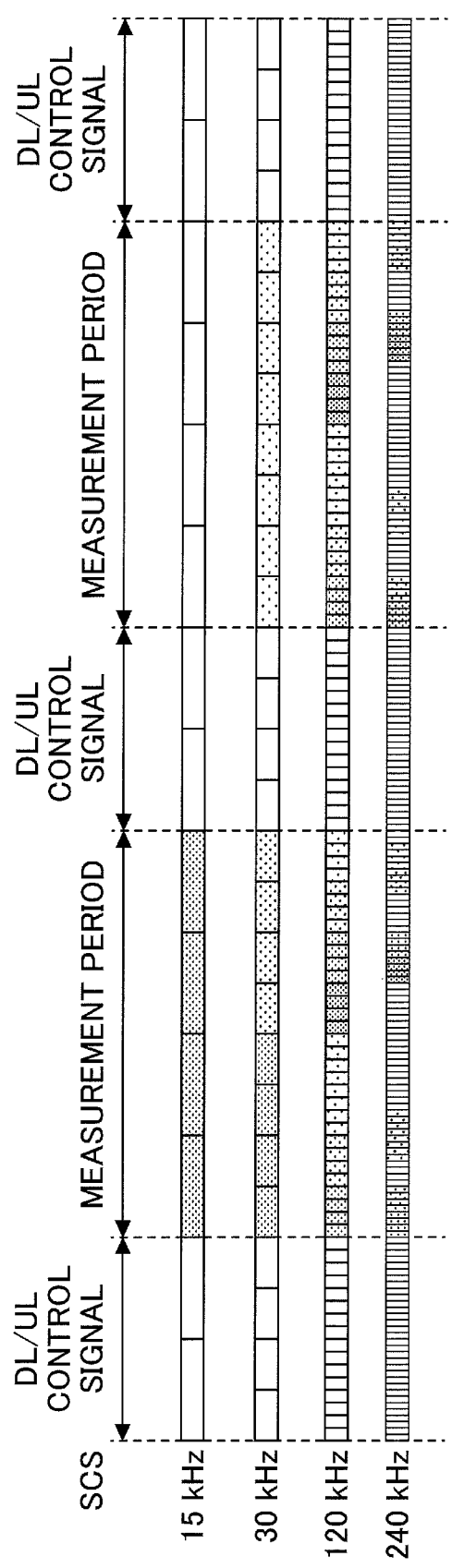
FIG. 10 illustrates an example where SS blocks are mapped in radio frames with a plurality of SCSs according to an embodiment of the present invention.

FIG. 10 illustrates an example where SS blocks are mapped in radio frames with a plurality of SCSs in parallel according to an embodiment of the present invention. FIG. 10 illustrates the radio frames for a case where SCSs are 15 kHz, 30 kHz, 120 kHz, and 240 kHz. As illustrated in FIG. 10, periods where DL/UL control signals are mapped and periods where SS blocks are mapped are arranged to be common with respect to the various SCSs.

Moreover, the base station apparatus 100 maps SS blocks in radio frames that have symbol arrangements as illustrated in FIG. 10 on the basis of the number of SS blocks per slot based on SCSs as in FIG. 9. In addition, the base station apparatus 100 performs mapping in such a way to separate a period where DL/UL control signals can be placed from a period where SS blocks can be placed. Through the mapping, flexibility of scheduling of DL/UL control signals is maintained. In FIG. 10, the number of SS blocks determined for each SCS illustrated in FIG. 9 is set, and measurement periods in the user apparatus 200 are the same 4 ms with respect to all SCSs.

According to the above-described second embodiment, as a result of the base station apparatus 100 appropriately mapping SS blocks in a radio frame on the basis of SCSs, flexibility of scheduling control signals is maintained, and the user apparatus 200 can complete a measurement in a measurement period common to different SCSs.

(Apparatus Configuration)

Next, a functional configuration example of the base station apparatus 100 and the user apparatus 200 implementing the above-described processes and operations will be described. Each of the base station apparatus 100 and the user apparatus 200 has at least the functions implementing the first and second embodiments. However, each of the base station apparatus 100 and the user apparatus 200 may have only some functions of the first and second embodiments.

<Base Station Apparatus 100>

Figure 11:
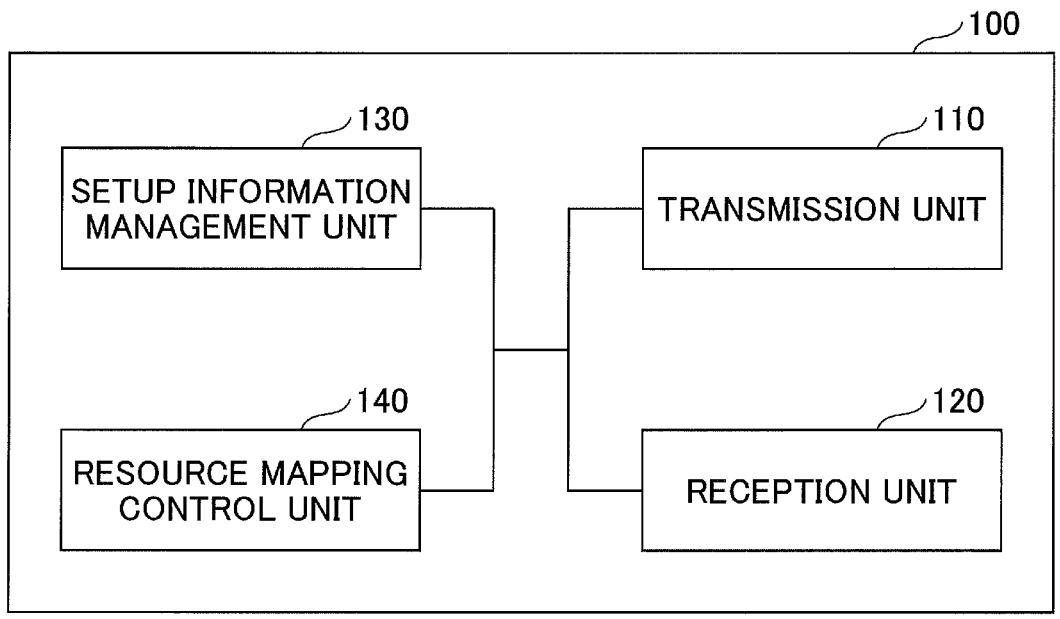
FIG. 11 illustrates an example of a functional configuration of a base station apparatus 100.

FIG. 11 illustrates one example of a functional configuration of the base station apparatus 100. As illustrated in FIG. 11, the base station apparatus 100 includes a transmission unit 110, a reception unit 120, a setup information management unit 130, and a resource mapping control unit 140. The functional configuration illustrated in FIG. 11 is merely one example. As long as the operations concerning the present carrying-out mode can be implemented, function classifications and names of functional units can be any classifications and names.

The transmission unit 110 includes functions to generate a signal to be transmitted to the user apparatus 200 and transmit the signal wirelessly. The reception unit 120 includes functions to receive various signals transmitted from the user apparatus 200 and obtain, for example, information of an upper layer from the received signals of a physical layer. In addition, the transmission unit 110 has functions to transmit, to the user apparatus 200, a NR-PSS, a NR-SSS, a NR-PBCH, DL/UL control signals, and so forth.

The setup information management unit 130 stores previously set setup information and various setup information to be transmitted to the user apparatus 200. The contents of setup information are, for example, information concerning a NR-PSS and a NR-SSS, information included in a NR-PBCH, information concerning a SCS, information concerning configurations of SS blocks included in a SS burst set and transmission periods, information concerning DL/UL control signals, and so forth.

The resource mapping control unit 140 performs control of mapping of SS blocks in a radio frame in the base station apparatus 100 described above for the basic example and the first and second embodiments. In addition, the resource mapping control unit 140 maps control signals, data, and so forth in a radio frame. A radio frame in which the resource mapping control unit 140 performs mapping is used by the transmission unit 110.

<User Apparatus 200>

Figure 12:
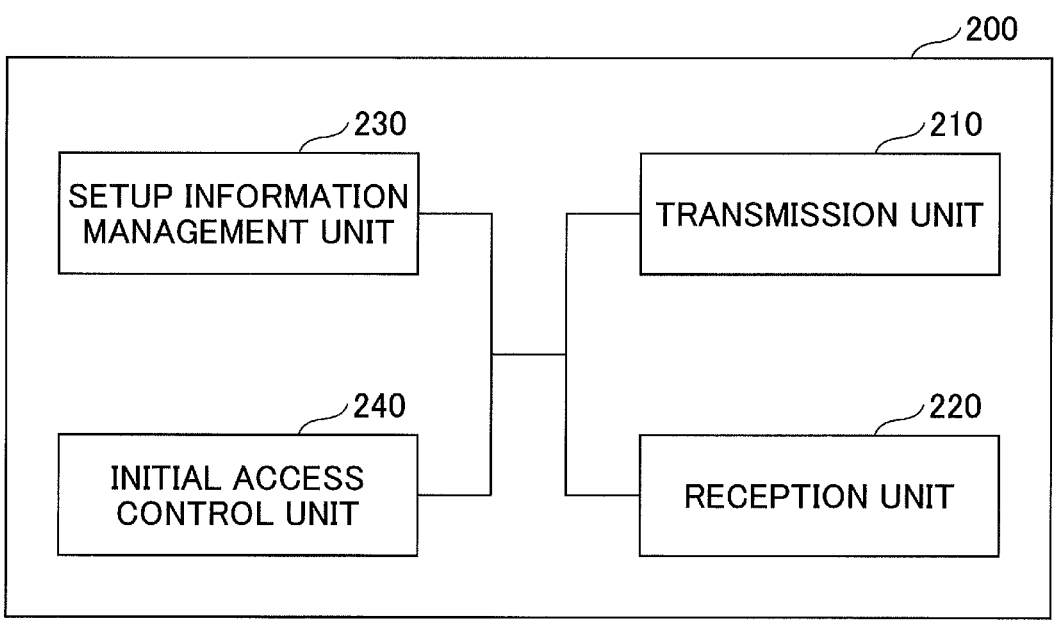
FIG. 12 illustrates an example of a functional configuration of a user apparatus 200.

FIG. 12 illustrates one example of a functional configuration of the user apparatus 200. As illustrated in FIG. 12, the user apparatus 200 includes a transmission unit 210, a reception unit 220, a setup information management unit 230, and an initial access control unit 240. The functional configuration illustrated in FIG. 12 is merely one example. As long as the operations concerning the present carrying-out mode can be implemented, function classifications and names of functional units can be any classifications and names.

The transmission unit 210 generates a transmission signal from transmission data and transmits the transmission signal wirelessly. The reception unit 220 receives various signals wirelessly and obtains information of an upper layer from the received signals of a physical layer. In addition, the reception unit 220 has functions to receive a NR-PSS, a NR-SSS, a NR-PBCH, DL/UL control signals, and so forth transmitted from the base station apparatus 100.

The setup information management unit 230 stores various setup information received from the base station apparatus 100 through the reception unit 220. The setup information management unit 230 also stores previously set setup information. The contents of setup information are, for example, information concerning a NR-PSS and a NR-SSS, information included in a NR-PBCH, information concerning a SCS, information concerning configurations of SS blocks included in a SS burst set and transmission periods, information concerning DL/UL control signals, and so forth.

The initial access control unit 240 performs control concerning an initial access in the user apparatus 200 described above concerning the basic example and first and second embodiments. Note that the functional units concerning signal transmission in the initial access control unit 240 may be included in the transmission unit 210, and the functional units concerning signal reception in the initial access control unit 240 may be included in the reception unit 220.

<Hardware Configuration>

The block diagrams used in the description for the above-mentioned embodiments (FIGS. 11 and 12) illustrate blocks in function units. These functional blocks (configuration units) are implemented by an arbitrary combination of hardware and/or software. In this regard, means for implementing the respective functional blocks are not limited. That is, each functional block may be implemented by one device that is a physical and/or logical combination of a plurality of elements. Alternatively, each functional block may be implemented by two or more devices that are physically and/or logically separated and directly and/or indirectly (for example, in a wired and/or wireless manner) connected together.

Figure 13:
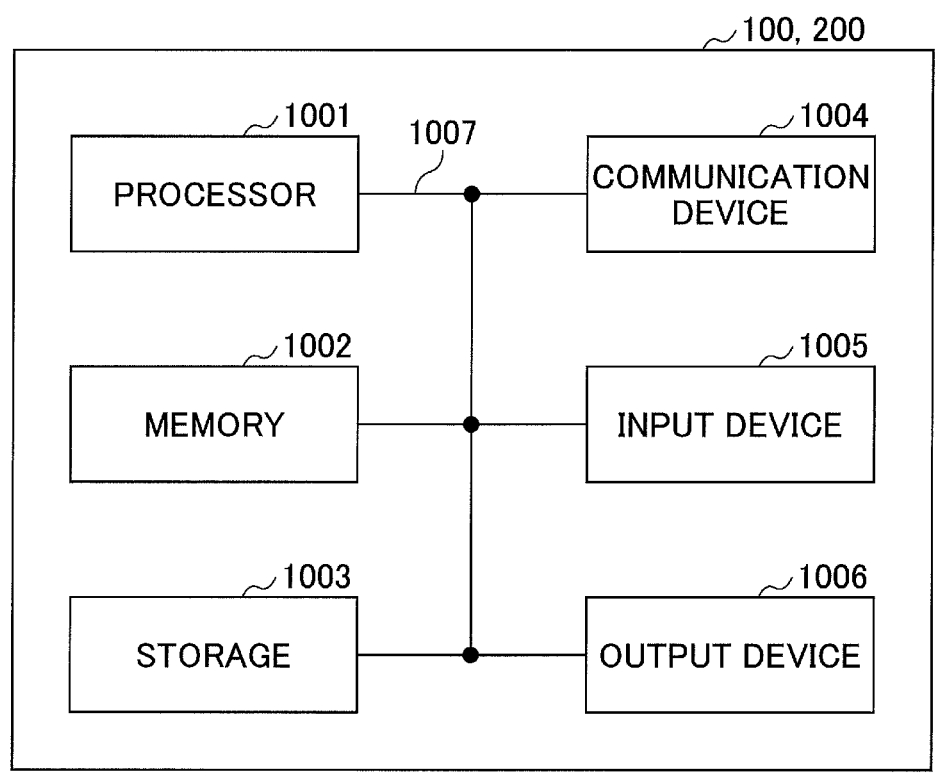
FIG. 13 illustrates an example of a hardware configuration of the base station apparatus 100 and the user apparatus 200.

Further, for example, each of the base station apparatus 100 and the user apparatus 200 according to the mode for carrying out the present invention may function as a computer that performs the processes according to the present carrying-out mode. FIG. 13 illustrates one example of a hardware configuration of the base station apparatus 100 and the user apparatus 200 according to the present carrying-out mode. Each of the above-described base station apparatus 100 and user apparatus 200 may be configured as a computer apparatus that physically includes a processor 1001, a memory 1002, a storage 1003, a communication device 1004, an input device 1005, an output device 1006, a bus 1007, and so forth.

Note that, below, the term "device" may be read as a circuit, a unit, or the like. The hardware configuration of the base station apparatus 100 and the user apparatus 200 may be configured to include one or more of the devices 1001-1006 illustrated, or may be configured not to include some of the devices 1001-1006 illustrated.

Each function in the base station apparatus 100 and the user apparatus 200 is implemented as a result of hardware such as the processor 1001 and the memory 1002 reading predetermined software (program), and thereby the processor 1001 performing operations to control communication by the communication device 1004 and control reading data from and/or writing data to the memory 1002 and the storage 1003.

The processor 1001 controls the entirety of the computer by causing an operating system to operate, for example. The processor 1001 may include a central processing unit (CPU) that includes an interface for a peripheral device, a control device, an arithmetic device, a register, and so forth.

Further, the processor 1001 reads a program (program code), a software module, or data from the storage 1003 and/or the communication device 1004 onto the memory 1002, and thus implements various processes according to the read information. As the program, a program that causes the computer to perform at least some of the operations described above for the above-mentioned carrying-out mode is used. For example, the transmission unit 110, the reception unit 120, the setup information management unit 130, and the resource mapping control unit 140 of the base station apparatus 100 illustrated in FIG. 10 may be implemented by a control program that is stored in the memory 1002 and operates with the processor 1001. Further, for example, the transmission unit 210, the reception unit 220, the setup information management unit 230, and the initial access control unit 240 of the user apparatus 200 illustrated in FIG. 12 may be implemented by a control program that is stored in the memory 1002 and operates with the processor 1001. In this regard, it has been described that the various processes described above are implemented by the single processor 1001. However, the various processes may be implemented by two or more processors 1001 simultaneously or sequentially. The processor 1001 may include one or more chips. The programs may be transmitted from a network through an electric communication line.

The memory 1002 is a computer readable recording medium and includes, for example, at least one of a ROM (Read-Only Memory), an EPROM (Erasable Programmable ROM), an EEPROM (Electrically Erasable Programmable ROM), a RAM (Random Access Memory), and so forth. The memory 1002 may be called a register, a cache, a main memory (main storage), or the like. The memory 1002 can store the program (program code), the software module, or the like executable for implementing the processes according to the mode for carrying out the present invention.

The storage 1003 is a computer readable recording medium and includes, for example, at least one of an optical disc such as a CD-ROM (Compact Disc ROM), a hard disk drive, a flexible disk, a magneto-optical disc (for example, a compact disc, a digital versatile disc, a Blu-ray (registered trademark) disc), a smart card, a flash memory (for example, a card, a stick, or a key drive), a floppy (registered trademark) disk, a magnetic strip, and so forth. The storage 1003 may be called an auxiliary storage device. The above-described recording medium may be, for example, a suitable medium such as a database, a server, or the like that includes the memory 1002 and/or storage 1003.

The communication device 1004 is hardware (a transmission and reception device) for performing communication between computers through a wired and/or wireless network and may also be called, for example, a network device, a network controller, a network card, a communication module, or the like. For example, the transmission unit 110 and the reception unit 120 of the base station apparatus 100 may be implemented by the communication device 1004. Further, the transmission unit 210 and the reception unit 220 of the user apparatus 200 may be implemented by the communication device 1004.

The input device 1005 is an input device (for example, a keyboard, a mouse, a microphone, a switch, a button, a sensor, or the like) that receives an input from the outside. The output device 1006 is an output device (for example, a display, a speaker, a LED light, or the like) that performs outputting to the outside. The input device 1005 and the output device 1006 may be configured as one unit (for example, a touch panel).

Further, the various devices such as the processor 1001 and the memory 1002 are connected together via a bus 1007 for performing communication of information. The bus 1007 may include a single bus or may include different buses corresponding to the devices.

Further, each of the base station apparatus 100 and the user apparatus 200 may include hardware such as a microprocessor, a digital signal processor (DSP), an ASIC (Application Specific Integrated Circuit), a PLD (Programmable Logic Device), or a FPGA (Field Programmable Gate Array). The hardware may implement some or all of the functional blocks. For example, the processor 1001 may be implemented by at least one of these types of hardware.

(Summary of Carrying-Out Mode)

As described above, according to the mode for carrying out the present invention, a base station apparatus that performs communication with a plurality of user apparatuses is provided. The base station apparatus includes a transmission unit that transmits a plurality of radio signals to the plurality of user apparatuses; and a control unit that arranges periodic blocks including a synchronization signal and system information in one or a plurality of radio signals from among the plurality of radio signals on the basis of a subcarrier spacing.

In the above-mentioned configuration, in the radio communication system including the base station apparatus and the user apparatuses, the base station apparatus suitably arranges blocks including a synchronization signal and system information in a radio signal to implement an efficient resource arrangement.

In the plurality of radio signals, an arrangement of the blocks may be implemented in such a way that opportunities to transmit control signals by the base station apparatus or a user apparatus increase. In this configuration, opportunities to transmit control signals are increased and efficient communication is implemented.

In a radio signal where periodic blocks are arranged, a first block and a second block that is the next block placed after the first block may be non-continuously arranged. In this configuration, flexibility of a resource arrangement is improved and it is possible to avoid overlapping with a control signal.

In a radio signal where periodic blocks are arranged, one or a plurality of symbols not including a synchronization signal may be placed between a third block and a fourth block that is the next block placed after the third block on the basis of a subcarrier spacing. In this configuration, the number of symbols provided between a block and another block where a block is not transmitted is changed according to a subcarrier spacing, and a control signal can be transmitted during a period of the symbols.

In the plurality of radio signals, an arrangement of blocks may be implemented in such a way that a period where a block is placed and a period where a control signal transmitted by the base station apparatus or a user apparatus is placed are separated. In this configuration, a gap common to a plurality of radio signals configured at different subcarrier spacings is provided, and flexibility of an arrangement of control signals is improved.

In a radio signal where periodic blocks are arranged, the number of blocks arranged in a predetermined period and positions of symbols where the blocks are arranged may be based on a subcarrier spacing; and, in each of the plurality of radio signals where periodic blocks are arranged, the number of blocks required for a user apparatus to start communication and associated with a single beam may be uniform in a predetermined period. In this configuration, the user apparatus 200 can perform an operation to start communication in a period that is uniform and common among the plurality of radio signals configured at different subcarrier spacings, resulting in that efficient initial access operations can be implemented.

(Supplement to Carrying-Out Mode)

Thus, the mode for carrying out the present invention has been described. However, the disclosed invention is not limited to such a mode for carrying out the present invention, and the person skilled in the art will understand various variants, modifications, replacements, and so forth. Although specific numerical values have been used as examples for promoting understanding of the invention, the numerical values are merely examples unless otherwise noted, and any other suitable values may be used instead. The classifications of items in the above description are not essential to the present invention, contents described in two or more items may be used in combination if necessary, and contents described in an item may be applied to contents described in another item (unless a contradiction arises). Boundaries between functional units or processing units do not necessarily correspond to boundaries of physical components. Operations of a plurality of functional units may be physically implemented by a single component and an operation of a single functional unit may be physically implemented by a plurality of components. Concerning the operation procedures according to the mode for carrying out the present invention, the order of steps may be changed unless a contradiction arises. For the sake of convenience for describing the operations, the base station apparatus 100 and the user apparatus 200 have been described with the use of the functional block diagrams. However, these apparatuses may be implemented by hardware, software, or a combination thereof. Each of the software functioning with the processor of the base station apparatus 100 according to the mode for carrying out the present invention and the software functioning with the processor of the user station 200 according to the mode for carrying out the present invention may be stored in any suitable recording medium such as a random access memory (RAM), a flash memory, a read-only memory (ROM), an EPROM, an EEPROM, a register, a hard disk (HDD), a removable disk, a CD-ROM, a database, or a server.

Further, sending of information may be implemented not only according to the mode for carrying out the present invention described herein but also by another method. For example, sending of information may be implemented with the use of physical layer signaling (for example, DCI (Downlink Control Information) or UCI (Uplink Control Information)), upper layer signaling (for example, RRC (Radio Resource Control) signaling, MAC (Medium Access Control) signaling, broadcast information (a MIB (Master Information Block), or a SIB (System Information Block)), or another signal, or a combination thereof. Further, RRC signaling may be called a RRC message, and, for example, may be a RRC Connection Setup message, a RRC Connection Reconfiguration message, or the like.

Each mode for carrying out the present invention described herein may be applied to a system that uses a suitable system such as LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), or Bluetooth (registered trademark), and/or a next-generation system expanded on the basis thereof.

Concerning the operation procedures, sequences, flowcharts, and so forth according to each mode for carrying out the present invention described herein, the orders of steps may be changed unless a contradiction arises. For example, concerning the methods described herein, various step elements are illustrated in exemplary orders and are not limited to the illustrated specific orders.

Specific operations performed by the base station apparatus 100 described herein may in some cases be performed by an upper node. It is clear that various operations performed for communication with the user apparatus 200 can be performed by the base station apparatus 100 and/or another network node (for example, a MME, a S-GW or the like may be cited, but not limited thereto) in a network that includes one or more network nodes including the base station apparatus 100. In the above, description has been made for the case where the another network node is a single node as an example. However, the another network node may be a combination of a plurality of other network nodes (for example, a MME and a S-GW).

Each mode for carrying out the present invention described herein may be solely used, may be used in combination with another carrying-out mode, or may be used in a manner of being switched with another carrying-out mode at a time of being implemented.

By the person skilled in the art, the user apparatus 200 may be called any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

By the person skilled in the art, the base station apparatus 100 may be called any one of a NB (NodeB), an eNB (enhanced NodeB), a gNB, a base station, and other suitable terms.

The term "to determine" used herein may mean various operations. For example, "to determine" may mean to consider having determined to have performed judging, calculating, computing, processing, deriving, investigating, looking up (for example, looking up a table, a database, or another data structure), or ascertaining, or the like. Also, "to determine" may mean to consider having determined to have performed receiving (for example, receiving information), transmitting (for example, transmitting information), inputting, outputting, or accessing (for example, accessing data in a memory), or the like. Also, "to determine" may mean to consider having determined to have performed resolving, selecting, choosing, establishing, comparing, or the like. That is, "to determine" may mean to consider having determined a certain operation.

Words "based on" or "on the basis of" used herein do not mean "based on only" or "on the basis of only" unless otherwise specified. That is, the words "based on" or "on the basis of" mean both "based on only" and "based on at least" or both "on the basis of only" and "on the basis of at least".

As long as any one of "include", "including", and variations thereof is used herein or used in the claims, this term has an intended meaning of inclusiveness in the same way as the term "comprising". Further, the term "or" used herein or used in the claims has an intended meaning of not exclusive-or.

Throughout the present disclosure, in a case where an article such as a, an, or the in English is added through a translation, the article may be of a plural form unless the context clearly indicates otherwise.

Note that a signal configured at a single SCS and including a plurality of radio frames occurring in the time direction is one example of a radio signal. The resource mapping control unit 140 is one example of a control unit. A plurality of symbols to which a single SS block is mapped or a single SS block is one example of a block.

Thus, the present invention has been described in detail. In this regard, it is clear that the person skilled in the art understands that the present invention is not limited to the mode for carrying out the present invention described herein. The present invention can be implemented in a modified or changed mode without departing from the effect and the scope of the present invention. Therefore, the description herein is for an illustrative purpose and does not have any restrictive meaning.

DESCRIPTION OF REFERENCE SIGNS

100 base station apparatus
200 user apparatus
110 transmission unit
120 reception unit
130 setup information management unit
140 resource mapping control unit
200 user apparatus
210 transmission unit
220 reception unit
230 setup information management unit
240 initial access control unit
1001 processor
1002 memory
1003 storage
1004 communication device
1005 input device
1006 output device

The invention claimed is:

1. A terminal that uses a plurality of subcarrier spacings including 15 kHz, 30 kHz, 120 kHz, and 240 kHz, the terminal comprising:

a receiver that receives, based on one of the plurality of subcarrier spacings, one or more symbols to which periodic blocks including a synchronization signal and system information are mapped; and a processor that performs random access by using a resource associated with the periodic blocks, wherein a period during which the periodic blocks are mapped is arranged to be common across the subcarrier spacings, wherein the receiver receives a signal in which a position of the symbols is determined on a basis of the subcarrier spacings, and wherein a maximum number of the periodic blocks included in an SS burst in a case where the subcarrier spacing is 120 kHz is the same as a maximum number of periodic blocks included in the SS burst in a case where the subcarrier spacing is 240 kHz.

2. The terminal as claimed in claim 1, wherein the receiver receives the signal in which the position of the symbols of the periodic blocks are separated from positions of symbols of control signals.

3. The terminal as claimed in claim 2, wherein the receiver receives a signal in which a symbol position of a first periodic block and a symbol position of a second periodic block are non-continuous.

4. The terminal as claimed in claim 1, wherein the receiver receives a signal in which a symbol position of a first periodic block and a symbol position of a second periodic block are non-continuous.

5. The terminal as claimed in claim 4, wherein the receiver receives a signal in which one or more symbols that do not include a synchronization signal are arranged between a symbol of the first periodic block and a symbol of the second periodic block.

6. A base station that uses a plurality of subcarrier spacings including 15 kHz, 30 kHz, 120 kHz, and 240 kHz, the base station comprising:

a processor that maps periodic blocks including a synchronization signal and system information to one or more symbols on a basis of one of the plurality of subcarrier spacings; and a transmitter that transmits the synchronization signal and the system information, wherein a period during which the periodic blocks are mapped is arranged to be common across the subcarrier spacings, wherein the transmitter transmits a signal in which a position of the symbols is determined on a basis of the subcarrier spacings, and wherein a maximum number of the periodic blocks included in an SS burst in a case where the subcarrier spacing is 120 kHz is the same as a maximum number of periodic blocks included in the SS burst in a case where the subcarrier spacing is 240 kHz.

7. A communication method executed by a terminal that uses a plurality of subcarrier spacings including 15 kHz, 30 kHz, 120 kHz, and 240 kHz, the communication method comprising:

receiving, based on one of the plurality of subcarrier spacings, one or more symbols to which periodic blocks including a synchronization signal and system information are mapped;

performing random access by using a resource associated with the periodic blocks, wherein a period during which the periodic blocks are mapped is arranged to be common across the subcarrier spacings; and receiving a signal in which a position of the symbols is determined on a basis of the subcarrier spacings, wherein a maximum number of the periodic blocks included in an SS burst in a case where the subcarrier spacing is 120 kHz is the same as a maximum number of periodic blocks included in the SS burst in a case where the subcarrier spacing is 240 kHz.

\* \* \* \* \*